Dec. 1, 1931.  R. H. GODDARD  1,834,149
MEANS FOR DECELERATING AIRCRAFT
Filed March 28, 1930   2 Sheets-Sheet 1
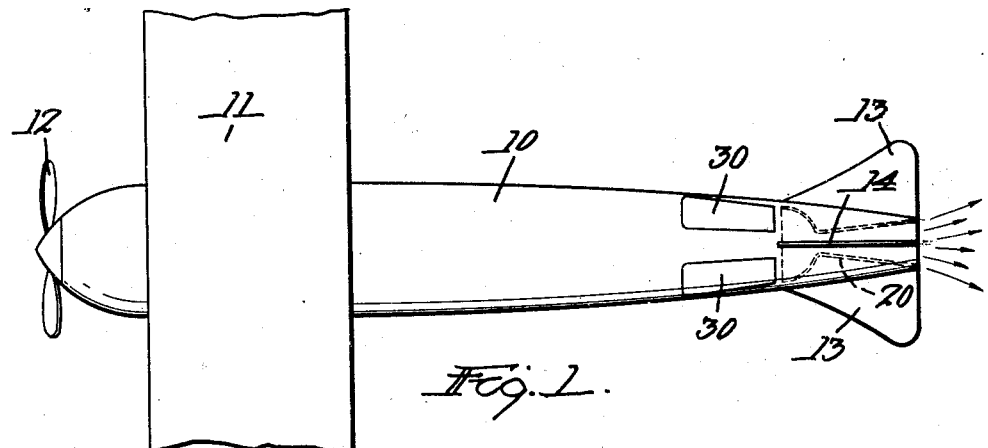
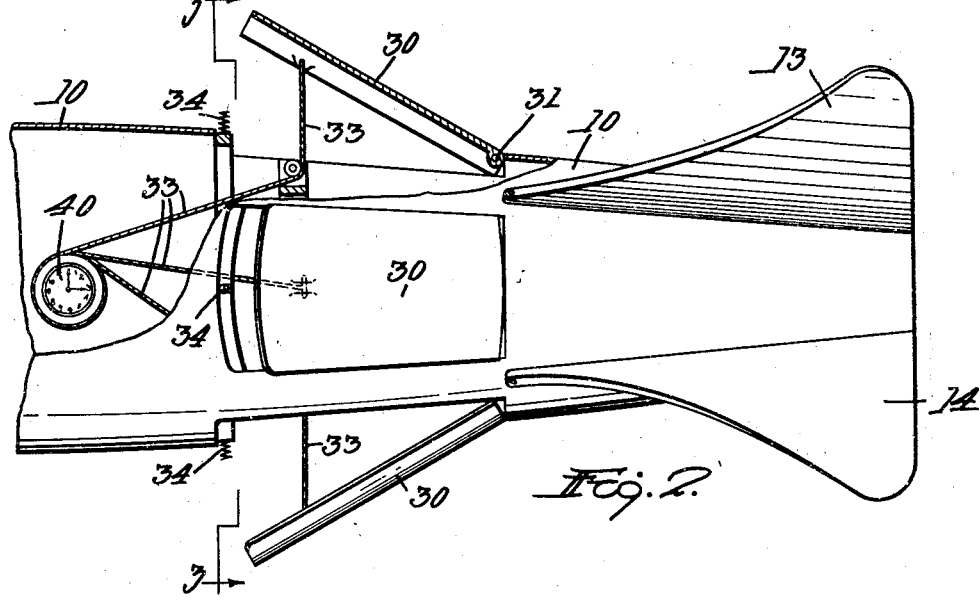
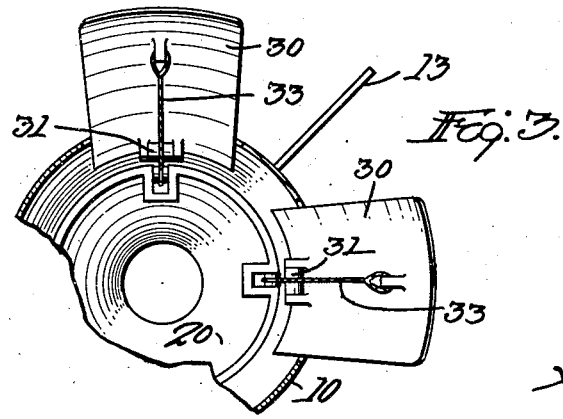
Inventor
Robert H. Goddard
By Attorneys
Southgate Fay & Hawley Dec. 1, 1931.    R. H. GODDARD    1,834,149
MEANS FOR DECELERATING AIRCRAFT
Filed March 28, 1930    2 Sheets-Sheet 2
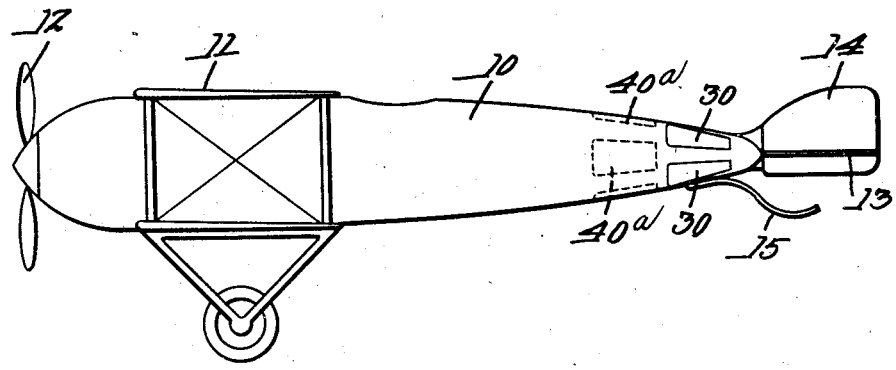
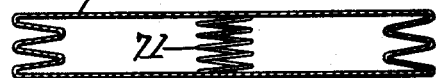
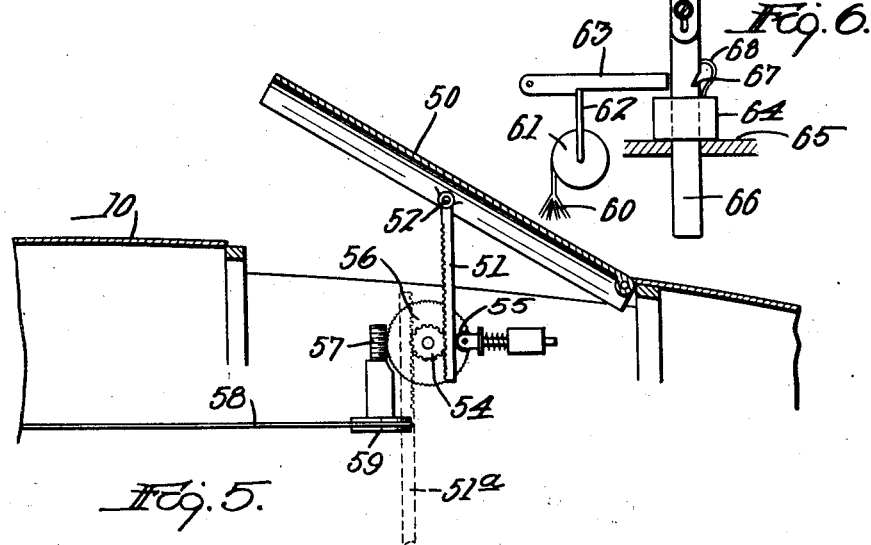
Inventor
Robert H. Goddard
By Attorneys

Patented Dec. 1, 1931

1,834,149

UNITED STATES PATENT OFFICE

ROBERT H. GODDARD, OF WORCESTER, MASSACHUSETTS

MEANS FOR DECELERATING AIRCRAFT

Application filed March 28, 1930. Serial No. 439,790.

This invention relates to air-craft and particularly to means for reducing the velocity thereof when occasion arises. In the operation of air-craft, it is frequently desirable to quickly reduce the velocity of the craft, as in preparation for landing or to avoid collision with some unexpected obstacle.

In the operation of rocket planes designed for high altitude work, very great speed will be attained beyond the earth's atmosphere and upon the return of the plane to a denser atmospheric medium, reduction in speed must be quickly accomplished to permit the plane to be landed without destructive results.

It is the general object of my invention to provide simple means for reducing the velocity of an air-craft without causing the plane to diverge from its line of flight and without taking the plane out of the control of the operator.

It is a further object of my invention to accomplish the above defined purpose without substantially adding to the weight of the air-craft or increasing the air resistance of the craft when the decelerating device is not in use.

My invention further relates to arrangements and combinations of parts which will be hereinafter described and more particularly pointed out in the appended claims.

Two forms of the invention are shown in the drawings, in which

Fig. 1 is a plan view of parts of an aeroplane embodying my invention;

Fig. 2 is an enlarged plan view, partly in section, of the rear portion of the plane;

Fig. 3 is a sectional front elevation, taken along the line 3—3 in Fig. 2;

Fig. 4 is a side elevation of the plane shown in Fig. 1;

Fig. 5 is a sectional side elevation of a modified construction; and

Fig. 6 is a sectional elevation of a further modification.

Referring particularly to Figs. 1 to 4, I have shown a plane having the usual stream line body 10, planes 11, propeller 12, elevating wings 13, rudder 14 and landing skid 15.

I have also indicated in broken lines at 20 a combustion chamber and expansion nozzle by which the plane may be propelled at high speed when travelling through relatively a light atmosphere. Either the propeller or the expansion nozzle may be omitted and the plane may be operated in the usual manner by the propeller alone or may be operated by the reaction of gases escaping through the nozzle 20, the means of propulsion forming no part of my present invention.

For the purpose of reducing the speed of the plane when occasion arises, I have provided decelerating members 30 pivoted at 31 to the body 10, the pivots being placed near the rear ends of the plane and the members 30 extending forwardly therefrom. Cords or cables 33 are attached to the forward ends of the members 30 and these cables limit the outward movement of the members 30 and also constitute means for closing the members 30 when no further decelerating action is desired.

When the members 30 are closed, they fit snugly into corresponding openings of the body 10 and are substantially continuous with the surface of the body, so that the air resistance of the plane is not increased thereby.

Springs 34 may be provided under the forward edges of the members 30 to give the members an initial outward movement when tension on the cables 33 is released. As soon as the initial outward movement takes place, the air pressure against the inner faces of the members 30 will effect further opening movement of the members, to the limit established by the cords 33.

The cords 33 may be released singly or simultaneously by the operator of the plane or, if used in a plane not manually controlled, the cords may be connected to a suitable timing mechanism 40 by which they will be released after a predetermined interval of flight.

It will be evident that the decelerating effect will depend upon the extent to which the members 30 are permitted to swing outward, and that the decelerating effect will be exerted along the line of flight if all of the members 30 are moved outward the same distance.

If certain members 30 are moved further than others, the effect will be to divert the plane in a predetermined direction. It is thus possible to a certain extent to steer the plane by manipulation of the decelerating members 30.

Preferably the members 30 are mounted out of alignment with the elevating wings 13 and rudder 14, so that they will not interfere with the usual operation thereof.

In Fig. 4, a second set of decelerating devices 40$^a$ are indicated and it will be evident that further additional sets of devices may be added if desired.

In Fig. 5, I have shown a modified construction by which decelerating members 50 may be positively moved outward or inward and may be positively held in any adjusted position. For this purpose, a rack bar 51 is pivoted at 52 to each member 50 and is held in engagement with a pinion 54 by a yielding pressor roll 55. The pinion 54 is secured to a worm wheel 56 rotatable by a worm 57 which may be rotated by a belt 58 and pulley 59 from any convenient location. As the worm 57 is rotated in one direction or the other, the decelerating member 80 will be swung inward or outward, said member being locked in position when the worm 57 is stationary.

An additional rack 51$^a$ may be actuated by the pinion 54 to move a second member 50. Additional members 50 may be added as desired.

It will be noted that the rear end portions of the decelerating members 30 or 50 are so hinged to the adjacent surfaces of the body 10 that a continuous and tight fitting joint is afforded in every position of the decelerating members, thus causing no perceptible increase in air resistance.

In Fig. 6 I have shown a construction by which the vanes may be caused to open upon an increase of atmospheric pressure as the plane approaches the denser atmosphere adjacent the earth's surface. For this purpose cords 60 attached to the vanes are secured to a drum or pulley 61 having an arm 62 engaging a latch 63 and normally retained in holding position thereby. A collar 64 rests upon a supporting surface 65 in the plane and engages the end of the latch 63 when moved from its normal position.

A two-part bar 66 is slidable through an opening in the collar 64 and is provided with a notch or shoulder 67 adapted to engage the end of a resilient hook 68 mounted on the collar 64. The upper end of the bar 66 is secured to an adjacent face of a corrugated metallic vacuum member or casing 70. A spring 71 within the casing exerts a predetermined expanding force on the walls of the casing.

The internal pressure of the casing is so proportioned to the spring 71 that the casing will be compressed at ordinary atmospheric pressure and will be expanded at the much lower pressures experienced beyond the earth's atmosphere.

Before starting a flight, the hook 68 will be withdrawn from the notch 67 allowing the collar 64 to slide downward along the bar 66 into engagement with the surface 65 and thus allowing the latch 63 to be placed in the position indicated in Fig. 6, in which position it holds the cords 60 from release. As the plane rises and the atmospheric pressure decreases, the bar 66 will be pushed downward through the collar 64 and the hook 68 will slide relatively upward to a point above the notch 67. As the plane returns towards the earth and atmospheric pressure increases, the casing will be compressed, overcoming the spring 71. At a predetermined point the notch or shoulder 67 will engage the hook 68, raising the collar 64 and releasing the latch 63. This in turn releases the decelerating vanes and the speed of the plane will be thereupon reduced. By adjusting the length of the bar 66, the pressure at which the vanes will be released may be variably determined.

Under certain operating conditions, it is found desirable to control the release of the vanes by reference to the atmospheric pressure, as indicated in Fig. 6, and under other conditions it is desirable to release the vanes after a predetermined period of flight by use of the timing device previously described.

Having thus described my invention and the advantages thereof, I do not wish to be limited to the details herein disclosed, otherwise than as set forth in the claims, but what I claim is:—

1. In an air-craft, a body elongated in the line of flight, a plurality of air-resisting elements arranged about the rear portion of said body said elements being movable to operative or inoperative positions, and means controlled by relative atmospheric pressure effective to release said elements for movement to operative position.

2. In an aircraft, a body elongated in the line of flight, a plurality of air-resisting elements arranged about the rear portion of said body, said elements being movable to operative or inoperative positions, and means effective to cause said elements to be moved to operative position upon decrease and subsequent increase of atmospheric pressure at said air-craft.

3. In an air-craft, a body elongated in the line of flight, a plurality of air-resisting elements arranged about the rear portion of said body, said elements being movable to operative or inoperative positions, and means effective to cause said elements to be moved to operative position upon decrease and subsequent increase of atmospheric pressure at said air-craft to a predetermined pressure.

4. In an air-craft, a body elongated in the line of flight, a plurality of air-resisting elements arranged about the rear portion of said body, said elements being movable to operative or inoperative positions, a device to hold said elements in inoperative position, and means controlled by atmospheric pressure at said air-craft and effective to release said device upon a rise in pressure at said air-craft to a predetermined pressure.

5. In an air-craft, a body elongated in the line of flight, a plurality of air-resisting elements arranged about the rear portion of said body, said elements being movable to operative or inoperative positions, a device to hold said elements in inoperative position, and means controlled by atmospheric pressure at said air-craft and effective to release said device upon a rise in pressure at said air-craft to a predetermined pressure following a fall in pressure below normal atmospheric pressure.

6. In an air-craft, a body elongated in the line of flight, a plurality of air-resisting elements arranged about the rear portion of said body, said elements being movable to operative or inoperative positions, a device to hold said elements in inoperative position, and means controlled by atmospheric pressure at said air-craft and effective to release said device upon a subsequent increase in pressure toward normal following a fall in pressure below normal at said air-craft.

7. In an air-craft, a body elongated in the line of flight, a plurality of air-resisting elements arranged about the rear portion of said body, said elements being movable to operative or inoperative positions, a closed expansible casing in said air-craft containing an expanding spring, a member connected to a movable part of said casing, a latch device effective to hold said elements in inoperative position, and a one way clutch connection between said latch device and said member.

In testimony whereof I have hereunto affixed my signature.

ROBERT H. GODDARD.